April 30, 1957     B. SHARE     2,790,509
DUST COLLECTOR
Filed Nov. 18, 1954
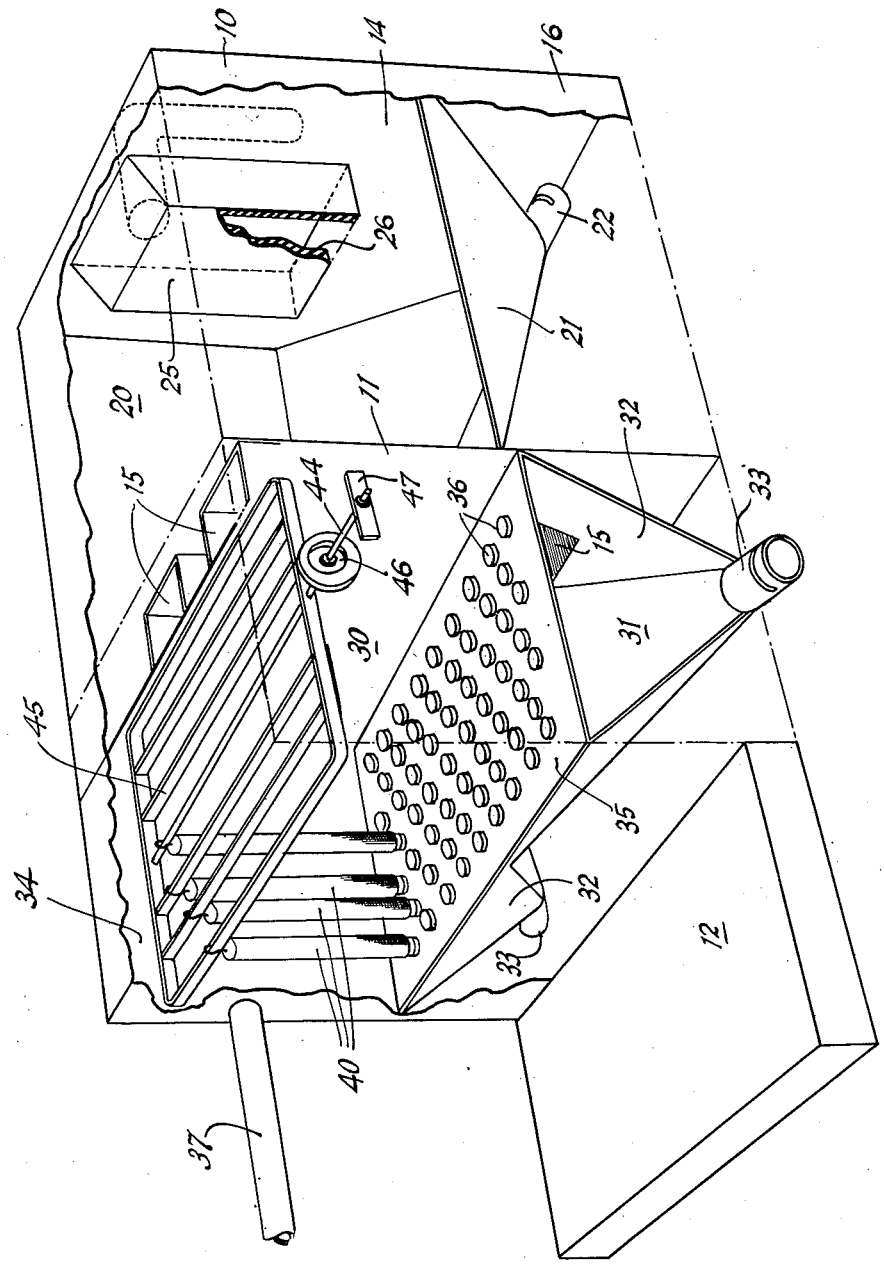
INVENTOR
Barnett Share
BY
his ATTORNEY

2,790,509

DUST COLLECTOR

Barnett Share, Hollis, N. Y.

Application November 18, 1954, Serial No. 469,714

8 Claims. (Cl. 183—34)

This invention relates to dust separators, such as used to remove rock dust from air streams, conveying cuttings from a drill hole. More particularly, the invention is directed to an improved dust separator of the type having a first compartment in which relatively large particles are separated from the entering air and communicating with a second compartment in which the finer particles are filtered from the air exiting to the suction apparatus.

In a known device of this type, the incoming air enters a "cyclone" or whirl chamber, in a first or "separating" compartment, where the larger or coarser particles are thrown out by centrifugal force. The air flows from the cyclone through a dust pipe into the lower half of a second or filtering compartment. This second compartment has an intermediate partition formed with apertures into which are connected the open lower ends of filter bags suspended in the upper section of the compartment. The dust-laden air flows upwardly into these filter bags and outwardly through the latter, leaving the dust in the filter bags. The clean air is drawn from the upper section of the second or filtering compartment into a blower or like apparatus connected to the latter.

While this arrangement has proven relatively effective in practice, it has certain operational features which are disadvantageous to its overall efficiency. The entering air, by virtue of flowing through the dust pipe connecting the whirl chamber to the filter compartment, enters the latter at a relatively high velocity. This mitigates against effective separation of the coarser particles in the whirl chamber. Additionally, the operation of the apparatus has to be stopped periodically for emptying of dust from the compartments.

The carry-through of the coarser particles into the filter compartment results in unduly rapid filling up of the filter bags, which thus have to be emptied more frequently. Such emptying of the filter bags is effected by opening a door in the filter compartment and shaking the bags. This introduces a dust hazard to the operator.

In accordance with the present invention, the operative efficiency and operational safety of apparatus of the foregoing type is improved by providing for more effective removal of the coarser particles in the separator compartment and for emptying of the dust filter bags without opening of the filter compartment.

More particularly, the incoming air enters horizontally into a dust box opening downwardly into a dust discharge chute forming the bottom wall of the separator compartment. The incoming air, impinging on a rubber lining of the dust box, has its direction of flow abruptly changed, resulting in throw-out of the coarser particles. This throw-out is augmented by the reversal of direction of the air flow in leaving the open lower end of the dust box to flow upwardly in the separator compartments into open top air ducts leading downwardly into the lower section of the filter compartment. At the same time, the air velocity is substantially reduced due to the relatively large volume of the separator compartment.

The dust-laden air entering the filter compartment flows up through the filter bags in the usual manner and out through the bag walls into the upper section of the filter compartment and thence to the blower. However, the bottom of the lower section of the filter compartment is formed as a dust discharge hopper, facilitating continuous removal of dust thrown out by the directional change in the air flow. The dust filter bags are suspended from a shaking frame mounted on a rod extending through a flexible diaphragm in the casing of the filter compartment. By shaking a handle on this rod outside the casing, the dust filter bags can be emptied without opening the filter compartment, thus eliminating the dust hazard. The discharge hoppers continuously discharge the separated dust so that periodic discharge shut-downs are no longer necessary.

For an understanding of the invention principles, reference is made to the following description of a typical embodiment thereof as illustrated in the accompanying drawings.

The single figure is a perspective view of the improved separator, portions of the casing being broken away to illustrate the internal arrangement.

Referring to the drawing, the separator comprises a casing 10 forming a housing divided, into a separator compartment 20 and a filter compartment 30, by a partition 11. A platform 12 at one end of the housing supports a blower (not shown), and the entire apparatus may be made portable.

Air from a drill hole or other dusty source is brought to the separator by a suction pipe (shown in dotted lines) extending through the rear wall 14 of casing 10. The incoming air enters a dust box 25 on the inside of wall 14. The dust laden air enters dust box 25 horizontally and impinges against a lining 26 of rubber or the like on the inner surface of box 25. This box is closed at its upper end and open only at its lower end. The air thus flows generally downwardly through box 25 and into compartment 20. The coarser particles thrown out of the air by its impingement against lining 26 and its change in direction fall onto hopper bottom 21 of compartment 20. Bottom 21 converges to a dust discharge spout 22 exiting from the separator.

Due to the relatively large volume of compartment 20, the air velocity is substantially reduced as the air flows upwardly through the compartment to enter the open upper ends of air ducts 15 on partition 11. These ducts lead downwardly and then through partition 11 into the lower section 31 of filter compartment 30.

This section of compartment 30 is formed by an intermediate partition or dust bag plate 35, having apertures 36 therein, and by two hopper bottoms 32, 32 converging to discharge spouts 33, 33 extending outwardly through casing 10. The air in section 31 flows through apertures 36 into the open lower ends of filter bags 40 connected to partition 35 at the apertures. Bags 40 are suspended from a frame 45 in the upper section 34 of compartment 30. The dust free air flows out of bags 40 into section 34 and is drawn out through pipe 37 leading to the blower.

The finer dust particles are gathered in bags 40 so that these bags must be emptied from time to time. To effect this without a dust hazard, shaking frame 45 is mounted on a rod 44 extending outwardly, in sealed relation, through a flexible partition 46 in side wall 16 of casing 10. A handle 47 on the outer end of rod 44 is used to shake frame 45 to empty bags 40 into hoppers 32.

While a specific embodiment of the invention has been shown and described in detail to illustrate the application of the invention principles, it will be understood that the invention may be embodied otherwise without departing from such principles.

What is claimed is:

1. A dust separator comprising a casing forming a substantially closed housing having substantially vertically disposed side walls; a substantially vertically arranged partition intermediate a pair of opposite side walls dividing said housing into a separator compartment and a relatively large volume filter compartment; a dust-laden air inlet opening in one of said opposite side walls immediately adjacent the upper edge thereof and directing air into said separator compartment perpendicularly to said one side wall; a dust box on the inner surface of said one side wall covering the inlet opening and comprising a substantially rectangular enclosure having a bottom opening and a vertical wall in spaced parallel relation to said one side wall and extending across and perpendicular to the path of flow of air through said inlet for impingement of the incoming dust-laden air on said vertical wall to throw out coarser particles; said dust box directing the dust-laden air downwardly into said separator compartment; upwardly opening conduit means extending downwardly along said partition and connecting the upper portion of said separator compartment to the lower portion of said filter compartment; an air exit opening in the opposite side wall communicating with the upper portion of said filter compartment; and dust collecting filter means in the air flow path between the lower and upper portions of said filter-compartment.

2. A dust separator as claimed in claim 1 in which said compartments have hopper shaped bottom walls converging to valved dust outlets to the exterior of said separator.

3. A dust separator as claimed in claim 1 in which said conduit means extend along said partition within said separator compartment and communicate, at their exit ends, with aperture means in the lowermost portion of said partition.

4. A dust separator as claimed in claim 1 in which said dust box is lined internally with a resilient material to prevent scoring by the dust particles.

5. A dust separator as claimed in claim 1 including an apertured substantially horizontal partition dividing said filter compartment into upper and lower portions; a plurality of filter bags in such upper portion of said filter compartment each having an open lower end secured to said horizontal partition in communication with an aperture therein; a frame secured to the closed open ends of said bags; an air exit opening in the opposite side wall communicating with the upper portion of said filter compartment; and a rod secured to said frame and extending through a flexible diaphragm in a side wall of said casing for vibrating said frame to shake dust from said filter bags into such lower portion of said filter compartment.

6. A dust separator as claimed in claim 5 in which said compartments have hopper shaped bottom walls converging to valved dust outlets to the exterior of said separator.

7. A dust separator as claimed in claim 5 in which a handle is provided on said rod exteriorly of said casing.

8. A dust separator as claimed in claim 5 in which said compartments have hopper shaped bottom walls converging to valved dust outlets to the exterior of said separator; and said conduit means extend along said partition within said separator compartment and communicate, at their exit ends, with aperture means in the lowermost portion of said partition, and comprise a pair of conduits each communicating with a separate hopper section of said filter compartment.

References Cited in the file of this patent

UNITED STATES PATENTS

| | | |
|---|---|---|
| 1,619,295 | Gardner | Mar. 1, 1927 |
| 2,057,578 | Kleissler | Oct. 13, 1936 |
| 2,115,134 | Anderson | Apr. 26, 1938 |
| 2,143,664 | Snyder | Jan. 10, 1939 |
| 2,656,009 | Kent | Oct. 20, 1953 |

FOREIGN PATENTS

| | | |
|---|---|---|
| 85,623 | Sweden | Feb. 25, 1936 |
| 402,087 | Italy | Feb. 16, 1943 |